United States Patent
Ockels et al.

(10) Patent No.: US 6,732,978 B2
(45) Date of Patent: May 11, 2004

(54) COMBINED PROPULSION SYSTEM INTENDED FOR A SPACECRAFT

(75) Inventors: Wubbo Johannes Ockels, Aerdenhout (NL); David Nicolini, Amsterdam (NL); Shailindersing Jainandunsing, Rotterdam (NL)

(73) Assignee: Agence Spatiale Europeenne, Paris (FR)

( * ) Notice: Subject to any disclaimer, the term of this patent is extended or adjusted under 35 U.S.C. 154(b) by 3 days.

(21) Appl. No.: 10/389,990

(22) Filed: Mar. 18, 2003

(65) Prior Publication Data

US 2003/0213874 A1 Nov. 20, 2003

(30) Foreign Application Priority Data

Apr. 8, 2002 (FR) .............................. 02 04336

(51) Int. Cl.$^7$ ................................ B64G 1/00

(52) U.S. Cl. .................... 244/172; 244/158 R; 244/166

(58) Field of Search ............................ 244/158 R, 172, 244/166

(56) References Cited

U.S. PATENT DOCUMENTS

| | | | |
|---|---|---|---|
| 4,083,520 A | | 4/1978 | Rupp et al. |
| 4,824,051 A | | 4/1989 | Engelking |
| 5,234,183 A | * | 8/1993 | Hammer ................ 244/158 R |
| 5,947,421 A | | 9/1999 | Beattie et al. |
| 6,116,544 A | * | 9/2000 | Forward et al. ........ 244/158 R |
| 6,195,980 B1 | | 3/2001 | Walther |
| 6,293,090 B1 | | 9/2001 | Olson |
| 6,362,574 B1 | * | 3/2002 | Aguero et al. ........... 315/169.3 |
| 6,419,191 B1 | * | 7/2002 | Hoyt et al. ............. 244/158 R |

OTHER PUBLICATIONS

Landis, Geoffrey A.: "Magnetobraking For Mars Return Vehicles", NASA Lewis Research Center; pp. 205–213.

Fearn, D.G.: "Ion Propulsion—A Technology For Improving The Cost–Effectiveness Of Large Communications Satellites", Electronics & Communication Engineering Journal, Jun. 1992, pp. 153–162.

Estes, R.D., et al.: "Bare Tethers For Electrodynamic Spacecraft Propulsion", Journal Of Spacecraft And Rockets, vol. 37, No. 2, Mar.–Apr. 2000, pp. 205–211.

Garrett, H.B., et al.: "Spacecraft Charging, An Update", The Jet Propulsion Laboratory, California Institute of Technology, pp. 260–277.

Hoyt, R., et al.: "Performance of the Terminator Tether For Autonomous Deorbit Of LEO Spacecraft", 35th ALAA/ASME/SAE/ASEE Joint Propulsion Conference & Exhibit, Jun. 20–24, 1999, pp. 1–10.

Blumer, J.H., et al.: "Practicality of Using A Tether For Electrodynamic Reboost Of The International Space Station", Space Technology and Applications International Forum, 2001, edited by M.S. El–Genk, 2001 American Institute of Physics, pp. 445–451.

* cited by examiner

Primary Examiner—Michael J. Carone
Assistant Examiner—Gabriel S. Sukman
(74) Attorney, Agent, or Firm—Clark & Brody

(57) ABSTRACT

The invention relates to a combined propulsion system for a spacecraft, combining an electric propulsion system and a tether propulsion system, characterized in that the electric propulsion system is an electrostatic system (EP) which has, on the one hand, a generator (G) for ejecting an ionized plasma, comprising at least one grid for electrostatically accelerating the ions in the plasma and, on the other hand, an electron generator (NM) generating electrons to maintain the electrical neutrality of the system, and in that the electron generator (NM) is coupled to a first end of the tether which is the opposite end to the end at which the plasma-ejection generator (G) is arranged, generating a compensating current ($I_c$) flowing along said tether.

5 Claims, 1 Drawing Sheet

COMBINED PROPULSION SYSTEM INTENDED FOR A SPACECRAFT

FIELD OF THE INVENTION

The subject of the present invention is a combined propulsion system intended for a spacecraft.

BACKGROUND ART

Two main techniques employing electrical energy are currently known and can be used by way of propulsion system for a spacecraft, for example to alter the orbit of a satellite.

The first technique, known as electric propulsion, employs a propulsion fluid which is heated or accelerated using an electric current. This technique can be used in different ways, in order to achieve high propulsion fluid expulsion speeds, and these fall under three main categories:

1) Electrothermal propulsion: the propulsion fluid is electrically heated and expanded in a nozzle.
2) Electrostatic propulsion: the ionized particles of the propulsion fluid are accelerated by an electric field. Such a system is described for example in U.S. Pat. No. 5,947,421 (BEATTIE) and U.S. Pat. No. 6,195,980 (WALTHER).
3) Electromagnetic propulsion: a current induced in a plasma of the propulsion fluid interacts with an internal or external magnetic field to generate an acceleration force along the axis of the ejected stream. Such a system is described in patent U.S. Pat. No. 6,293,090 (OLSON).

Such systems make it possible to considerably increase the exit speeds of the propulsion fluid, by comparison with chemical rocket motors, this increase being of about one order of magnitude, making them highly advantageous for space missions.

These techniques do, however, have the disadvantage of requiring that electrical energy be available and their thrust density (defined as the thrust per unit area of the exit of the propulsion nozzle) is markedly lower than that obtained with chemical rocket motors.

The second technique employs an electrodynamic tether which is in the form of a very long (typically several hundred meters long) conducting wire which extends from a spacecraft, for example a satellite. The gravity gradient creates a force (known as the "tidal force") which orients the tether in a vertical direction. If, for example, the tether is attached to a satellite in orbit around the Earth, it crosses the lines of the Earth's magnetic field at a speed equal to the orbital speed of the satellite, for example 7 to 8 km/s in the case of a satellite in a medium orbit. The movement of the tether through a magnetic field induces a potential difference which may be of the order of several hundreds of volts per kilometer length.

If the system is equipped with a device for collecting electrons from the plasma in the ionosphere at one end of the tether and for expelling these electrons at the other end of the tether, then the tether acts as a brake. Such a system is described in the article by Robert P. HOYT and Robert L. FORWARD entitled "Performance of the Terminator Tether for Autonomous Deorbit of LEO Spacecraft", published in 1999 under the reference AIAA99-2839, pages 1 to 10 by the American Institute of Aeronautics and Astronautics.

The voltage generated creates a current along the tether and this current J, by interacting with the Earth's magnetic field B, generates a Lorentz force F equal to the product J.B which has the effect of slowing the satellite+tether assembly and the electrodynamic force thus created lowers the orbit of the satellite+tether assembly. The energy balance for the operation is that the tether converts the orbital energy of the spacecraft into electrical energy which is dissipated by thermal heating of the tether.

In acceleration mode (see, for example, patent U.S. Pat. No. 4,824,051) the tether is used to accelerate the spacecraft and therefore increase the altitude of its orbit. A device of this type is also described in the article by John H. BLUMER and collaborators, entitled "Practicality of using a Tether for Electrodynamic Reboost of the International Space Station", published in 2001, page 445 to page 451 in "Space Technology and Applications Forum—2001", published by M. S. El GENK—American Institute of Physics. For this, an electric generator is coupled to the tether to force an electric current in the opposite direction to the normal direction of flow corresponding to braking and the current generates a Lorentz acceleration force which increases the orbit of the spacecraft. This propulsion technique has the advantage of not requiring the ejection of a propulsion fluid, but the disadvantage of being sensitive to irregularities in the magnetic field.

The aforementioned patent U.S. Pat. No. 6,293,090 suggests the simultaneous but independent use of electric propulsion and a tether system before the spacecraft is taken to a higher orbit.

SUMMARY OF THE INVENTION

The subject of the present invention is a propulsion system intended for a space vessel, which combines a tether propulsion system and an electric propulsion system.

The idea underlying the invention is to combine an electrodynamic tether propulsion system and an electrostatic propulsion system.

Thus the invention relates to a combined propulsion system for a spacecraft, combining an electric propulsion system and a tether propulsion system, characterized in that the electric propulsion system is an electrostatic system which has a generator for ejecting an ionized plasma, comprising at least one grid for electrostatically accelerating the ions in the plasma and, on the other hand, an electron generator generating electrons to maintain the electrical neutrality of the system, and in that the electron generator is coupled to a first end of the tether which is the opposite end to a second end at which the plasma-ejection generator is arranged, generating a compensating current flowing along said tether.

As the electron generator is coupled to the end of the tether which is the opposite end to the end at which the device for ejecting ionized plasma that provides electrostatic propulsion is arranged, the neutralizing current flows through the tether and this current, with the magnetic field with which the spacecraft is surrounded, produces a Lorentz force which accelerates the satellite, enhancing the propulsive action of the electrostatic system.

The system may be characterized in that the plasma-ejection generator is arranged on the spacecraft and in that the electron generator is coupled to a free end of the tether which is the opposite end to the end at which the tether is attached to the spacecraft and electrically coupled thereto.

According to another alternative, it is characterized in that the electron generator is arranged on the spacecraft and in that the plasma-ejection generator is secured to a free end of the tether to which end it is electrically coupled, this free end being at the opposite end to the end at which the tether is attached to the spacecraft and is electrically coupled thereto.

The system may comprise a device for deploying the tether and the device (ion-ejection generator or electron generator) which is coupled to its free end.

Advantageously, the tether propulsion system comprises said tether, said electron generator and a device for deploying the tether and said electron generator which is coupled to said free end of the tether.

BRIEF DESCRIPTION OF THE DRAWINGS

Other features and advantages of the invention will become better apparent from reading the description which will follow, given by way of nonlimiting example, in conjunction with the attached drawings in which.

DESCRIPTION OF THE PREFERRED EMBODIMENTS

Figure 1A:
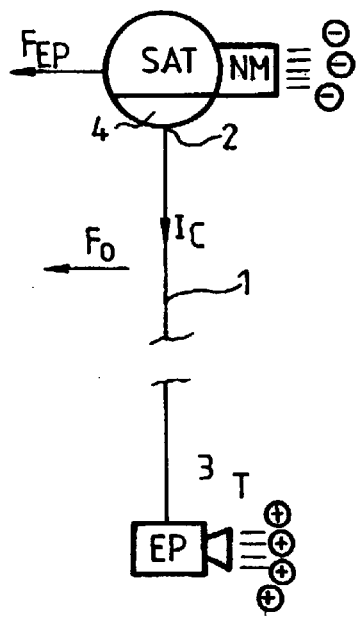
FIGS. 1a and 1b illustrate two alternative forms of the invention.

In FIG. 1a, a spacecraft, for example a satellite SAT, is equipped with a deployed tether 1. The tether 1 is attached to the satellite SAT by one end 2 and its free end 3, the opposite end to the end 2, bears an electrostatic propulsion device provided with an ejection nozzle T, which emits positive ions, hence a propulsion force $F_{EP}$ is imparted to the spacecraft. On board the spacecraft SAT is a neutralization module NM, for example an electron gun which emits electrons into space. The consequence of this emission is a compensation current $I_c$ which flows through the tether 1 in the direction shown, which current, through an electrodynamic effect, generates a force $F_o$, preferably parallel to the force $F_{EP}$, and which strengthens the effect of the latter.

Depending on the direction in which the spacecraft, for example a satellite in orbit around a planet, is journeying, the tether or conducting wire 1 is deployed toward the planet, for example the Earth, or alternatively away from the planet, so that the current $I_c$ flowing from the end 2 toward the end 3 generates a force $F_o$ which strengthens the force $F_{EP}$.

Figure 1B:
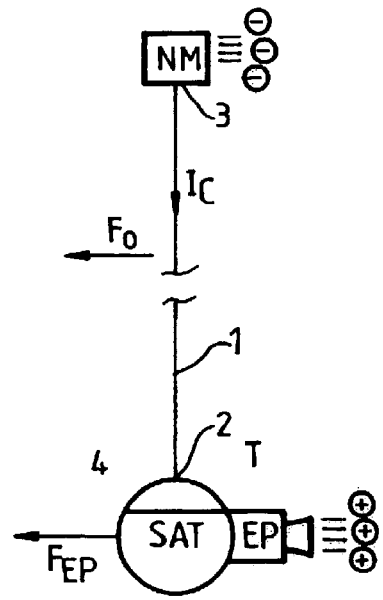

In the case of FIG. 1b, the spacecraft SAT carries the electrostatic propulsion device EP while the neutralization module is arranged at the free end 3 of the tether 1.

All other things being equal, the tether 1 needs to be deployed in the opposite direction by comparison with FIG. 1a so that the current $I_c$ (which flows from the end 3 toward the end 2) generates a force F which strengthens the action of the propulsion force EP [sic].

In known electrostatic propulsion devices, the ion emitter and the neutralization module (which emits electrons) are arranged close together. According to the invention, they are separated in space, being electrically connected via the tether 1 which thus has the compensation current passing through it. This compensation current is thus put to good use to produce additional propulsion. This modification is particularly easy to perform with an ion thruster (an ion emitter system with an accelerating grid) or alternatively a field effect electric propulsion (FEEP) nozzle. The neutralization module NM, which is independent of the propulsion module is preferably a field emission cathode array (FEA), a Spindt-type cathode or alternatively a carbon monotube [sic] cathode.

In general, it is preferable to choose the configuration of FIG. 1b whereby the electrostatic propulsion module EP is arranged on board the spacecraft SAT and the neutralization module NM is coupled to the free end 3 of the tether 1. This is because the neutralization module NM has a mass and a volume which are very much smaller than those of an electrostatic propulsion module, which means that the deployment (and the retraction) of the tether 1 are far easier if the free end 3 carries the neutralization module NM.

The system advantageously comprises a tether 1 coated with an insulator, a device 4 for deploying the tether, and the control electronics for the electrostatic propulsion module EP, for the neutralization module NM and for the deployment device 4.

It is preferable for the electrical supply of the spacecraft to be electrically insulated from the remainder of the spacecraft, so as to prevent it from becoming electrically charged.

Once the satellite is in orbit and the tether 1 has been deployed all that is required is for the electrostatic propulsion module EP and the neutralization module NM to be switched on.

Ions of a propulsion gas are ejected by the nozzle T and electrons are emitted by the neutralization module NM.

The thrust F is thus generated by the combined action of the propulsion force $F_{EP}$ and of the Lorentz force $F_o$ induced by the current $I_c$ passing through the tether 1, namely:

$$F = F_{EP} + F_o$$

with $$F_o = L(I_c \times B)$$

L denoting the length of the tether 1, and B the local strength of the magnetic field.

For the Earth's magnetic field, an approximate formula is as follows:

$$B(R, \lambda) = \frac{B_o \sqrt{1 + \sin^2 \lambda}}{R^3}$$

λ magnetic latitude
R vertical distance measured in radii of the Earth ($R_E$)
$B_o$ magnetic field on the surface of the Earth at the equator:
$B_o = B(R_E, o) = 0.3$ Gauss $= 3 \cdot 10^{-5}$ T

EXAMPLE

Assuming $F_o$ and $F_{EP}$ to be Parallel

The electrostatic propulsion system EP is an ion emitting system of the RITA XT type ($F_{EP}$=100 mN, power: 3250 W, discharge current: 1.7 A).

The satellite is in orbit with λ=o and at an altitude of 400 km. The length L of the deployed tether is equal to 5 km.

By applying the above formula, we get:

$$F_o = 212 \text{ mN, hence } F = 312 \text{ mN}$$

The power consumption of the combined system is 5.3 kW, namely a specific power of 17.2 W/mN (considering that the tether 1 is an aluminum wire with a resistance per unit length of 0.03 Ω/m) and the specific impulse is 12 499 s.

The combined system exhibits performance markedly better than the RITA XT system alone, the power consumption of which is 32.5 W/mN and the specific impulse of which is 3250 s.

Figure 2:
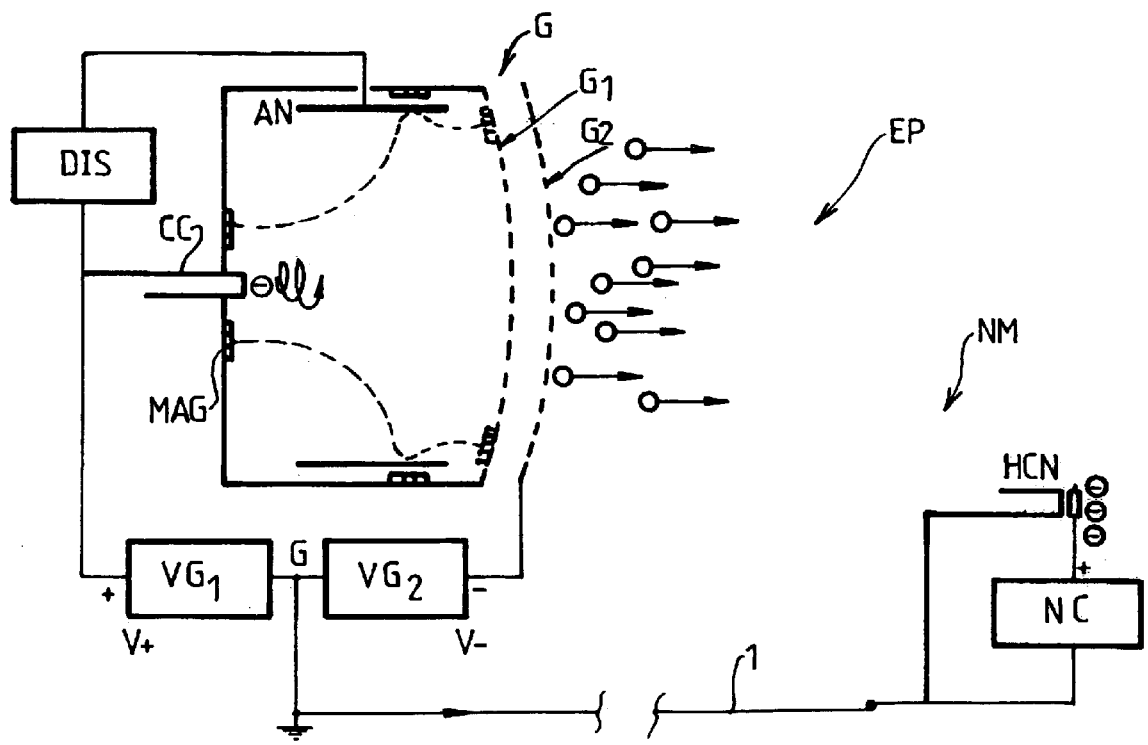
FIG. 2 illustrates one embodiment of the invention.

The device of FIG. 2 shows the adaption of an ion emitter such as the RITA XT, to the case of the present invention. The electrostatic propulsion module G comprises an annular anode AN, a hollow cathode CC, a discharge circuit DIS between the anode AN and the cathode CC and, on the ion outlet side, two grids in series, namely a screen grid G1, and an acceleration grid G2.

Note the annular magnet MAG around the hollow cathode CC. Two voltage generators, a generator VG1 of a positive voltage V+ connected to the discharge circuit DIS and to the hollow cathode CC, and a generator VG2 of negative voltage V− connected to the accelerator grid G2. The point G common to these two generators is connected to the common mode pole or ground to which one end, for example 2, of the tether 1 is connected. The other end, for example 3, of the tether 1 is connected to the neutralization module MN, in this instance of the hollow cathode HCN type, controlled by a neutralization circuit NC: because the two devices are distant, the neutralization circuit NC can be equipped with a radio link to receive from the satellite SAT control signals for controlling the neutralization.

The invention affords at least one of the following advantages:

appreciable increase in thrust, substantial drop in the power/thrust ratio (or specific power) of the system, making it possible to obtain a far greater thrust for the same power consumption, a significant increase in the specific impulse, and therefore a reduction in the mass of propulsive material required for a mission, the possibility of deploying the tether only when needed, for example when the spacecraft is in orbit around a planet that has a magnetic field that can be used and, in the other cases, of operating the spacecraft in the conventional way using the electrostatic thrust module EP (anchored to the satellite if the tether is in the retracted position), the possibility of using the tether alone at the end of the life of the system by deploying it in an appropriate way for reentry into the atmosphere in the absence of propulsive material or even of electrical power: please refer to the article by R. Hoyt and R. Forward entitled "Performance of the Terminator Tether for Autonomous Deorbit of LEO Spacecraft" published in the 35th AIAA/ASME/SAE/ASEE, Joint Propulsion Conference and Exhibit; Jun. 20–24, 1999, Los Angeles—Calif., pages 1 to 10 (American Institute of Aeronautics and Astronautics), the possibility of controlling and stabilizing the tether as it deploys and retracts by altering the direction of thrust of the electrostatic module EP in such a way as to generate mechanical tension to stabilize the tether and compensate for the gravity gradient.

What is claimed is:

1. Combined propulsion system for a spacecraft, combining an electric propulsion system and a tether propulsion system, characterized in that the electric propulsion system is an electrostatic system (EP) which has, on the one hand, a generator (G) for ejecting an ionized plasma, comprising at least one grid for electrostatically accelerating the ions in the plasma and, on the other hand, an electron generator (NM) generating electrons to maintain the electrical neutrality of the system, and in that the electron generator (NM) is coupled to a first end of the tether which is the opposite end to the end at which the plasma-ejection generator (G) is arranged, generating a compensating current ($I_c$) flowing along said tether.

2. System according to claim 1, characterized in that the plasma-ejection generator (G) is arranged on the spacecraft (SAT) and in that the electron generator (NM) is coupled to a free end (3) of the tether (1) which is the opposite end to the end (2) at which the tether (1) is attached to the spacecraft (SAT) and electrically coupled thereto.

3. System according to claim 2, characterized in that the tether propulsion system comprises said tether (1), said electron generator (NM) and a device (4) for deploying the tether (1) and said electron generator (NM) which is coupled to it.

4. System according to claim 1, characterized in that the electron generator (NM) is arranged on the spacecraft (SAT) and in that the plasma-ejection generator (G) is secured to a free end (3) of the tether (1) to which end it is electrically coupled, this free end being at the opposite end to the end (2) at which the tether (1) is attached to the spacecraft (SAT) and is electrically coupled thereto.

5. System according to claim 4, characterized in that it comprises a device (4) for deploying the tether (1) and the plasma-ejection generator (G).

* * * * *